United States Patent Office 3,442,677
Patented May 6, 1969

3,442,677
CHEMICALLY TREATED CLAYS
John Wesly Balentine, Borger, Tex., and Joseph Iannicelli and James B. Whitley, Macon, Ga., assignors to J. M. Huber Corporation, Locust, N.J., a corporation of New Jersey
No Drawing. Filed May 2, 1966, Ser. No. 546,558
Int. Cl. C04b 33/12
U.S. Cl. 106—288                                              1 Claim

ABSTRACT OF THE DISCLOSURE

A method of improving the brightness of kaolin clays by adding organic agents, such as oxalic acid and acid solutions of oxalic acid salts, to a water-clay slurry and subjecting the treated slurry to high speed shearing at an elevated temperature is disclosed.

---

This invention is concerned with improving the brightness of clays. More particularly, this invention is concerned with a method for improving the brightness of kaolin clays through the use of acids and acid salts.

Clays, in their natural state, vary considerably in their color properties, even when produced from mines in the same locality or from different sites in the same mine. Kaolin clay deposits contain discoloring contaminants, for example, iron and titanium minerals, montmorillonite, and other minerals. Often a clay is rejected as being unacceptable solely on the basis of color, even though its other physical properties such as viscosity and particle size are within desired limits.

A common or conventional method for increasing the brightness of clays is treatment with any of the well-known clay reducing agents, among those most useful are zinc and sodium hydrosulphite. This chemical bleaching usually results in an increase in brightness of around two to five points. In many instances this is insufficient to increase the brightness to acceptable specifications due to the original low brightness of the starting kaolin clay. Further, it has been ascertained that the use of large quantities of these chemical bleaching agents does not necessarily result in brightness improvement beyond a peak value.

It is, therefore, the primary object of this invention to provide a method for increasing the brightness of clays.

Another object of this invention is to provide a method for increasing the brightness of finished clays to acceptable specifications when starting from low brightness crude clays.

A further object of this invention is to provide a method for increasing the brightness of crude kaolin clays to acceptable specifications.

These and other objects and advantages will be apparent from the following detailed description.

Generally, the objects of this invention are accomplished by treating a clay slurry under conditions of high shear and high temperature with an organic acid or an acid solution of organic acid salts.

More specifically, clays from the mines are generally crushed or blunged and then slurried with water in order to produce a clay slip or slurry. Normally, these slurries are then classified to the desired clay fraction by such well-known methods as gravity sedimentation, hydroseparation, and centrifugal forces. Prior to this classification, the clay slurries have usually been treated with a peptizing or dispersing agent in order to achieve a maximum dispersion of the clay particles to facilitate fractionation. These dispersing agents are conventional in the prior clay art and among those which may be used are polyphosphates, carbonates, silicates, alkalies in general, mixtures thereof and basic salts. The amounts of these agents used in the dispersion or deflocculation of the clay slurries may vary from two pounds per ton of dry clay to 20 pounds per ton of dry clay, the exact amount depending on the clay system itself and the amount of dispersion of the clay particles required. In some instances, the crude clay is degritted and bleached without further treatment.

We have now discovered that by treating the unbleached or conventionally bleached clay slurries with oxalic acid a significant increase in brightness results. The oxalic acid treatment will produce the best results when at least forty (40) pounds of acid per ton of dry clay is used and the clay slurry sheared by a rotating member having a peripheral speed of between 2000 f.p.m. and 11,000 f.p.m. for a period of from 30 to 70 minutes at a temperature from about 80° C. to the boiling point of the slurry. The clay solids in the slurry may vary from about 20 percent to about 60 percent with the preferred being 30 percent. Not only oxalic acid may be used, but acid solutions of oxalic acid salts are also effective, such as ammonium oxalate, and potassium oxalate.

A wide range of kaolin clays have shown significant brightness improvements by the use of this invention. These include the following clays: Hydrafine®, a paper coating clay having a particle size of 92 percent by weight of particles finer than two microns and a trace coarser than five microns; Hydrosperse®, a paper coating fraction having a particle size of 80–82 percent by weight finer than two microns and three to six percent coarser than five microns; CWF, a coarse filler fraction having a particle size of 30–40 percent by weight finer than two microns and 26–44 percent coarser than five microns; and a degritted crude clay having a particle size of 55–65 percent by weight finer than two microns and 15–25 percent coarser than five microns. In each case, a marked brightness improvement was obtained whether the starting material was unbleached or bleached by the conventional method. The effect was, of course, considerably greater when the starting material was unbleached. The brightness of clays is determined under a standard procedure described in TAPPI T-644 m-54. Hydrafine, Hydrasperse and CWF clays are Georgia kaolin clays mined and processed by the J. M. Huber Corporation at Huber, Ga.

The types of shearing equipment which can be used in the practice of this invention are a Kady Mill, a Waring Blendor, a Cowles Dissolver, or equipment of similar design. Preheating the clay slurry to a temperature of about 80° C. reduces the time of shearing to attain the desired effect.

The invention is fully explained by the following examples which are illustrative and not limiting thereof. All percentages therein are by weight unless otherwise indicated.

Example 1

As a control for the next four examples, an unbleached Hydrafine® clay having a G.E. brightness of 81.8 was slurried to 30 percent solids. A portion of this slurry was bleached with 10 pounds of zinc hydrosulphite and eight pounds of alum per ton of dry clay. The finished clay had a brightness of 87.2.

Example 2

A portion of the starting clay slurry from Example 1 was poured in the mixing cup of a Waring Blendor and 50 pounds of oxalic acid per ton of dry clay was added. The slurry was sheared at a rotor peripheral speed of 11,000 f.p.m. until the shearing action produced a slurry temperature of 90° C., after which the shearing was continued for an additional 55 minutes at a temperature of 90–100° C. At the end of the shearing period, the slurry was diluted with water and filtered. The finished dry clay had a brightness of 85.7.

Example 3

Example 2 was repeated using 75 pounds of oxalic acid which resulted in a finished clay brightness of 88.8.

Example 4

Example 2 was repeated using 100 pounds of oxalic acid which resulted in a finished clay brightness of 89.0.

Example 5

Example 2 was repeated using 200 pounds of oxalic acid which resulted in a finished clay brightness of 89.1.

Example 6

As a control for the next four examples, an unbleached Hydrafine® clay having a brightness of 80.9 was slurried to 30 percent solids. A portion of the slurried clay was bleached with 10 pounds of zinc hydrosulphite and eight pounds of alum per ton of dry clay which resulted in a finished clay brightness of 85.8.

Example 7

A portion of the starting slurry of Example 6 was diluted to 20 percent solids and poured into the mixing cup of a Waring Blendor. To this slurry was added 400 pounds of oxalic acid per ton of dry clay. The slurry was sheared at a rotor peripheral speed of 11,000 f.p.m. until the temperature of the slurry reached 90° C. The shearing action was continued for 60 minutes at 90–100° C. after which the slurry was removed from the mixing cup and filtered. The finished dry clay had a brightness of 88.9.

Example 8

Example 7 was repeated at 30 percent solids and 232 pounds of oxalic acid per ton of dry clay. The brightness of this clay was 89.0

Example 9

Example 7 was repeated at 45 percent solids and 122 pounds of oxalic acid per ton of dry clay. The clay had a brightness of 89.0.

Example 10

Example 7 was repeated at 60 percent solids and 66 pounds of oxalic acid per ton of dry clay. This clay had a brightness of 87.0.

The aqueous concentration of oxalic acid in Examples 7 through 10 was 5 percent in each case.

Example 11

As a control for the next five examples, an unbleached Hydrafine® clay having a brightness of 81.8 was slurried to 30 percent solids. A portion of the slurried clay was bleached with 10 pounds of zinc hydrosulphite per ton of dry clay which resulted in a finished clay brightness of 87.2.

Example 12

A portion of the starting slurry of Example 11 was placed in a mixing container of a Kady Mill and 200 pounds of oxalic acid per ton of dry clay was added. The slurry was sheared at a rotor peripheral speed of 8,000 f.p.m. until the temperature of the slurry reached 80° C. The shearing action was continued for an additional 10 minutes at 80° C. At the end of this time, the slurry was filtered, washed and dried. This clay had a brightness of 86.1.

Example 13

Example 12 was repeated except the shearing action was maintained for 20 minutes at a temperature of 90° C. This clay had a brightness of 88.3.

Example 14

Example 12 was repeated except the shearing action was continued for 30 minutes at a temperature of 95° C. This clay had a brightness of 88.7.

Example 15

Example 12 was repeated except the shearing action was continued for 40 minutes at a temperature of 80° C. This clay had a brightness of 88.9.

Example 16

Example 12 was repeated except the shearing action was continued for 55 minutes at a temperature of 95° C. This clay had a brightness of 89.0.

Example 17

Example 12 was repeated except the shearing action was continued for 70 minutes at a temperature of 95° C. This clay had a brightness of 89.1.

Example 18

A sample of Georgia crude clay having a brightness of 79.5 and 59.2 percent finer than two micron diameter particles and 15.0 percent coarser than five micron diameter particles, was slurried to 30 percent solids and placed in a mixing container of a Kady Mill. To this slurry was added 75 pounds of oxalic acid per ton of dry clay and the slurry sheared at a rotor peripheral speed of 8,000 f.p.m. This shearing action continued for 70 minutes at a temperature of 95° C. to 100° C. The slurry was then withdrawn from the mixing container, filtered and dried. This clay had a brightness of 84.1. The fine fraction, 90 percent finer than two microns, extracted from this clay, had a brightness of 87.2.

A portion of the starting slurry of this example was bleached with 10 pounds of zinc hydrosulphite and eight pounds of alum per ton of dry clay which gave a brightness of 83.3.

Example 19

A sample of an unbleached Hydrasperse® clay having a brightness of 80.1 was slurried to 30 percent solids and placed in the mixing cup of a Waring Blendor. To this slurry was added 75 pounds of oxalic acid per ton of dry clay and the slurry was sheared at a peripheral speed of 11,000 f.p.m. for 60 minutes at 90° C. to 100° C. At the end of the shearing period the slurry was diluted with water and filtered. The finished dry clay had a brightness of 86.1.

Example 20

A sample of an unbleached CWF clay having a brightness of 80.6 was treated by the procedure of Example 19. The finished clay had a brightness of 84.0.

The above examples were repeated using acid solutions of ammonium oxalate, sodium oxalate and potassium oxalate with similar improvements in clay brightness.

From the above examples it is obvious that the preferred amount of acid or acid salts used is between 40 and 120 pounds per ton of dry clay. In addition, while the mixing period with the acid treatment may range upwardly from 20 minutes, the preferred is around 60 minutes. Further, while the temperature may vary as low as about 80° C. and up to around the boiling point, the preferred temperature is around the boiling point. The shear rate may vary as low as 2,000 f.p.m. peripheral speed and up to about 11,000 f.p.m. The method of this invention is applicable to clays of a wide range of particle size.

While the present invention has been described with reference to certain embodiments thereof, it is obvious that there may be variations which fall within the true spirit and scope of the invention.

We claim.

1. A method for improving the brightness of kaolin clays, comprising adding to a water-clay slurry an organic agent selected from the group consisting of oxalic acid, an acid solution of ammonium oxalate, an acid solution of sodium oxalate, and an acid solution of potassium oxalate, in an amount of at least 40 pounds per ton of dry clay, subjecting said slurry to high shear action of an impeller having a peripheral speed of at least 2,000 f.p.m. for at least 20 minutes at a temperature of at least 80° C.

References Cited

UNITED STATES PATENTS

| | | | |
|---|---|---|---|
| 1,385,716 | 7/1921 | Ryan | 23—110.2 |
| 1,588,956 | 6/1926 | Feldenheimer | 23—110.2 |
| 3,106,476 | 10/1963 | Millman et al. | 106—72 |

FOREIGN PATENTS

| | | |
|---|---|---|
| 929,539 | 6/1963 | Great Britain. |

JAMES E. POER, *Primary Examiner.*

U.S. Cl. X.R.

23—110